350-393 SR
XR 3,448,282

OPTICAL AND GATE

Filed Jan. 12, 1968

INVENTORS
HAROLD FLEISHER
THOMAS J. HARRIS

BY Sughrue, Rothwell, Mion, Zinn & Macpeak
ATTORNEYS

3448282
OR IN 250/225

United States Patent Office 3,448,282 Patented June 3, 1969

3,448,282
OPTICAL AND GATE

Harold Fleisher and Thomas J. Harris, Poughkeepsie, N.Y., assignors to International Business Machines Corporation, Armonk, N.Y., a corporation of New York Filed Jan. 12, 1968, Ser. No. 697,407
Int. Cl. H01j *39/12;* G02f *1/18*
U.S. Cl. 250—225 8 Claims

ABSTRACT OF THE DISCLOSURE

An optical AND gate employing linearly polarized light and a tube having a photocathode. An optical image illuminates the photocathode to produce a field of secondarily emitted electrons which charge an electro-optical crystal to form a charge image thereon corresponding to the optical image. A linearly polarized light beam scans the crystal and passes through uncharged areas substantially unchanged. However, in passing through a charged area, the polarization of the light beam is changed from its original state. An analyzer is positioned in the path of the light passing through the crystal and is oriented to block light linearly polarized in the original direction. Consequently, light passing through an uncharged area of the crystal is blocked by the analyzer, but light passing through a charged area has its polarization state changed so that a portion of the light beam passes through the analyzer to provide an optical output signal indicating coincidence of an image light spot with the position of the polarized scanning light beam. The optical output signal is applied to a photomultiplier tube to produce a corresponding electrical output signal.

*Background of the invention*

This invention relates to electro-optical logic devices.

*Summary of the invention*

The object of this invention is to provide an improved optical AND gate which requires two optical inputs to get an optical output. It can be used as a read-out device to provide random accessing of information stored on a memory surface or in various display applications. The AND gate comprises an electro-optical crystal whose birefringence is dependent upon an electric charge applied thereto. Means responsive to an optical image signal applies an electrical charge to the crystal in accordance with an optical image. A polarized light beam is directed onto the crystal. Polarization-sensitive means responsive to the passage of the light beam through a charged portion of the crystal produces an optical output signal indicative of coincidence of the optical image signal and the light beam.

*Description of preferred embodiments*

Figure 1:
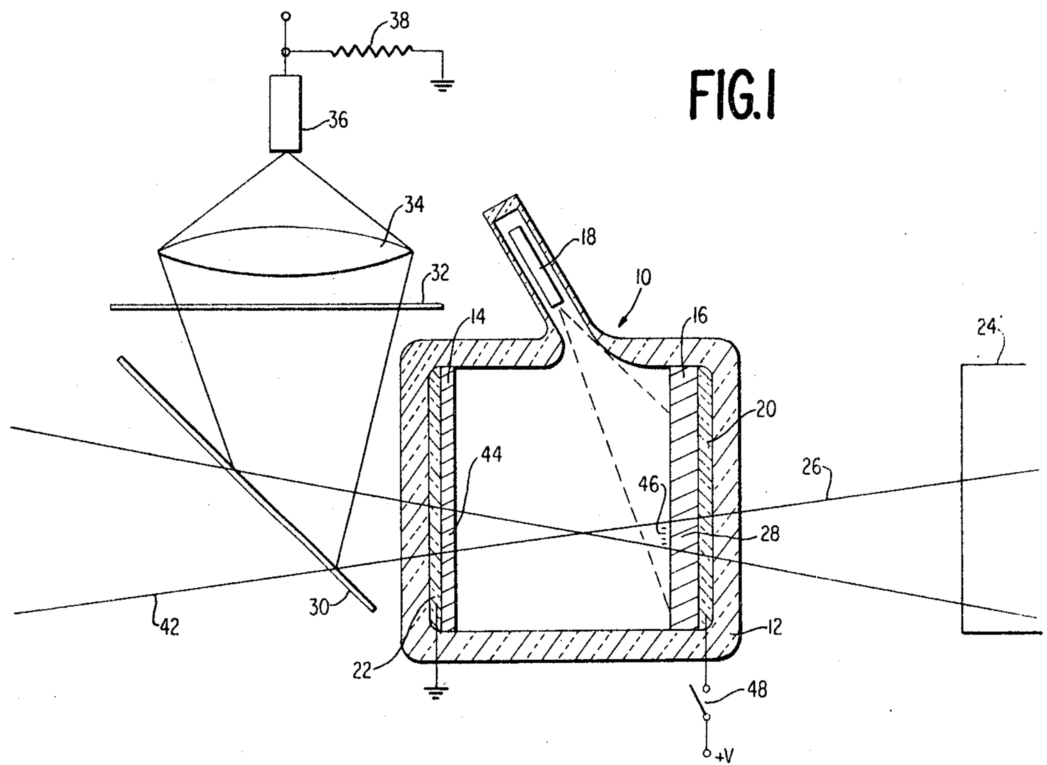
FIGURE 1 is a schematic diagram of a preferred embodiment of the improved optical AND gate.

FIGURE 1 is a schematic diagam of a preferred embodiment of the improved optical AND gate. A tube 10 consists of a transparent glass envelope 12 which encloses a transparent glass envelope 12 which encloses a transparent photocathode 14, an electro-optic crystal 16, such as KDP, and an electron flood gun 18. Crystal 16 has a transparent conductive coating 20 on one side thereof, and photocathode 14 has a transparent conductive coating 22 on one side thereof.

A digital light deflector 24 is operated by means not shown to selectively direct a linearly polarized light beam 26 to different areas, such as area 28, of crystal 16. The light beam 26 passes through glass envelope 12, transparent coating 20, crystal 16, the transparent photocathode 14, conductive coating 22, and again through the glass envelope 12 to be partially reflected by a beam splitter 30 to an analyzer 32. Any light passing through the analyzer is focused by a lens 34 onto a photo-multiplier tube 36 which produces an electrical output signal across a resistor 38.

Another linearly polarized light beam 42 passes through beam splitter 30, enelope 12 and transparent coating 22 to photocathode 14. An accelerating potential +V is connected via a switch 48 between the transparent coatings 20 and 22. When light beam 42 impinges upon an area, such as 44, of photocathode 14, emitted electrons are attracted by the potential gradient to cause an electron charge to be applied to an area 28 on the face of crystal 16. This area on the face of the crystal then has an electron charge indicated by the minus signs 46.

The AND gate operates as follows: Light beam 42 may contain an image, such as of a photographic memory containing fields of binary bits represented by light and no-light or dark spots. A field is selected and imaged onto photocathode 14. Each light spot causes electrons to be emitted from the photocathode and be accelerated by the potential gradient to the crystal 16. For example, light on area 44 causes area 28 on crystal 16 to assume an electron charge, thereby developing a potential across the crystal in that area.

Switch 48 is closed during the imaging of the field on the photocathode. However, the switch is opened to remove the accelerating field before read-out by the beam 28, thereby preventing any further emission by the photocathode. Light beam 26 functions as an interrogating or read-out beam and is scanned across the crystal 16 by deflector 24 by means not shown. When beam 26 strikes a charged area, such as area 28, the linear polarization state of the lightbeam is changed as it passes through the crystal and then is partially reflected by beam splitter 30 to the analyzer 32. The analyzer 32 is oriented to block light linearly polarized in the original polarization direction of the light beam 26 emanating from the digital deflector 24. However, when the light beam polarization state is changed by the charged area 28, some light will pass through the analyzer and be focused by lens 34 on a photo-multiplier tube 36 to produce a current proportional to the light passing through the analyzer. An output voltage is then developed across resistor 38. Consequently, the coincidence of light in area 44 and light on area 28 provides an optical output which in turn can be converted to an electrical signal proportional to the intensity of the input beam 42.

However, when the linearly polarized light 26 impinges upon an area of crystal 16 which is not negatively charged, the light passes through the crystal without any change in its polarization state. In this case, the light reflected by beam splitter 30 will be blocked by the analyzer 32 and therefore no output voltage will appear across resistor 38.

The stored charge on crystal 16 is erased prior to the next imaging operation by using a flood electron beam from the flood gun 18. The velocity of the flood electrons is adjusted to give the proper secondary emission ratio.

Figure 2:
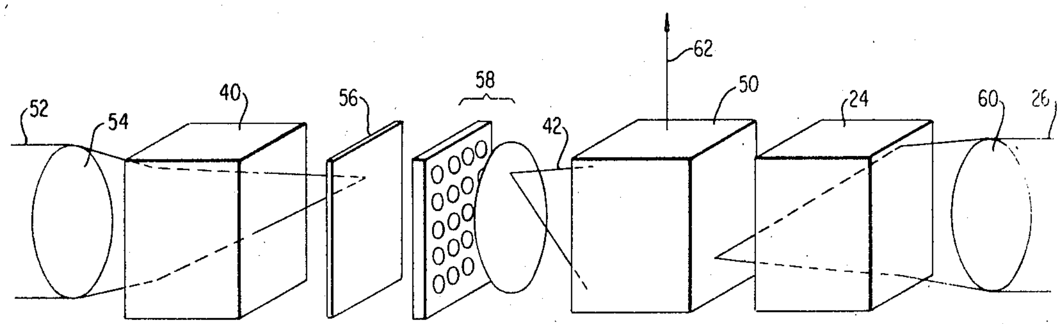
FIGURE 2 is a schematic diagram of a system incorporating the optical AND gate of FIGURE 1 as a read-out device to permit random accessing information stored on a memory surface.

FIGURE 2 illustrates a memory system using laser beams and including the optical AND gate of FIGURE 1 which functions as a read-out device to permit random accessing of information stored on a memory surface. Corresponding elements in FIGURES 1 and 2 are labeled with the same reference numerals.

Block 50 in FIGURE 2 schematically represents the optical AND gate of FIGURE 1 and specifically includes the tube 10, the beam splitter 30, analyzer 32, lens 34, photomultiplier tube 36 and resistor 38.

A linearly polarized light beam 52 passes through a lens 54 and through the digital light deflector 40 which may be controlled by computer or other control means (not shown) to direct the beam to a selected field of bits on a photographic memory surface 56, such as a photographic film. The selected field is then imaged by a lens array 58 onto the photocathode of the optical AND gate 50. In order to randomly access or read-out a bit position in the selected field, the linearly polarized beam 26 is focused by a lens 60 through digital light deflector 24 which is controlled by means not shown to scan the beam across the crystal 16. Whenever the beam strikes an area which is charged by the electrons from the photocathode, an electrical output signal indicated by the arrow 62 is produced. A charged area corresponds to a light spot in the image on the photocathode. A light spot may be chosen to designate a binary 1 and a dark (no light) spot may be binary 0. The manner in which gate 50 operates is described in detail above in conjunction with FIGURE 1. It can be seen that the system of FIGURE 2 permits light deflector 24 to randomly select a bit in the field which is imaged on the photocathode of the AND gate.

The tube 10 can also be used as a TV picture tube.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An optical AND gate comprising:

(a) an electro-optic crystal whose birefringence is dependent upon an electric charge applied thereto, (b) means responsive toan optical image signal for applying an electrical charge to an area of said crystal in accordance with an optical image, (c) means for directing a polarized light beam onto said crystal, and (d) polarization-sensitive means responsive to the impingement of said polarized light beam on a charged area of said crystal to produce an optical output signal.

2. An optical AND gate as defined in claim 1 further comprising means responsive to said optical signal for producing a coresponding electic signal.

3. An optical AND gate as defined in claim 1 further comprising means for discharging the charged area of said crystal.

4. An optical AND gate as defined in claim 1 further comprising:

(a) a ray tube having a photocathode capable of emmiting electrons in response to incident light, said electro-optic crystal being positioned within said tube in the path of electrons emitted from said photocathode, (b) means for exposing said photocathode to said optical image signal whereby electrons electrically charge an area of said electro-optic crystal in accordance with said image, thereby inducing birefringence in the charged area of said crystal, (c) means for directing onto said crystal a linearly polarized light beam, whereby the direction of polarization of said light beam is changed when the beam impinges upon a charged area of said crystal, and (d) analyzer means for passing light from a charged area while blocking light from an uncharged area, thereby producing said optical output signal.

5. Tn optical AND gate as defined in claim 4 wherein said tube further comprises means for discharging the charged area of said crystal by flooding said crystal with an electron beam.

6. An optical AND gate as defined in claim 4 wherein:

(a) said optical image signal consists of a binary light pattern consisting of light and dark areas corresponding to areas of said electro-optic crystal, and (b) said directing means comprises means for scanning the areas of said crystal with said polarized light beam so that said optical output signal corresponds to said light and dark areas of said binary light pattern.

7. In an optical data storage system including a memory in which data is stored in fields of bits in optical form, an improved system for randomly reading out the stored data comprising:

(a) a polarization-sensitive optical AND gate having first and second optical inputs and an optical output, (b) means for imaging a memory field on said first input, (c) means for applying to said second input at a position corresponding to a selected bit position in the image field a light beam linearly polarized in a first direction, and (d) means for providing at said optical output an optical output signal when the position of said light beam coincides with a data bit at that position.

8. The improved sysem as defined in claim 7 wherein:

(a) said gate includes:

(1) a light responsive electron emissive surface coupled to said first input, and (2) an electro-optic crystal coupled to said second input, and (b) said output signal providing means comprising an analyzer oriented to block light polarized in said first direction.

References Cited

UNITED STATES PATENTS

| | | | |
|---|---|---|---|
| 3,027,806 | 4/1962 | Koelsch | 250—225 X |
| 3,214,595 | 10/1965 | Johnson et al. | 250—217 X |
| 3,248,552 | 4/1966 | Bryan | 250—213 X |
| 3,253,497 | 5/1966 | Dreyer | 178—7.87 X |
| 3,396,305 | 8/1968 | Buddecke et al. | 350—150 X |

JAMES W. LAWRENCE, *Primary Examiner.*

D. O'REILLY, *Assistant Examiner.*

U.S Cl. X.R.

178—7.87; 250—213, 217; 350—150